UNITED STATES PATENT OFFICE 2,563,826

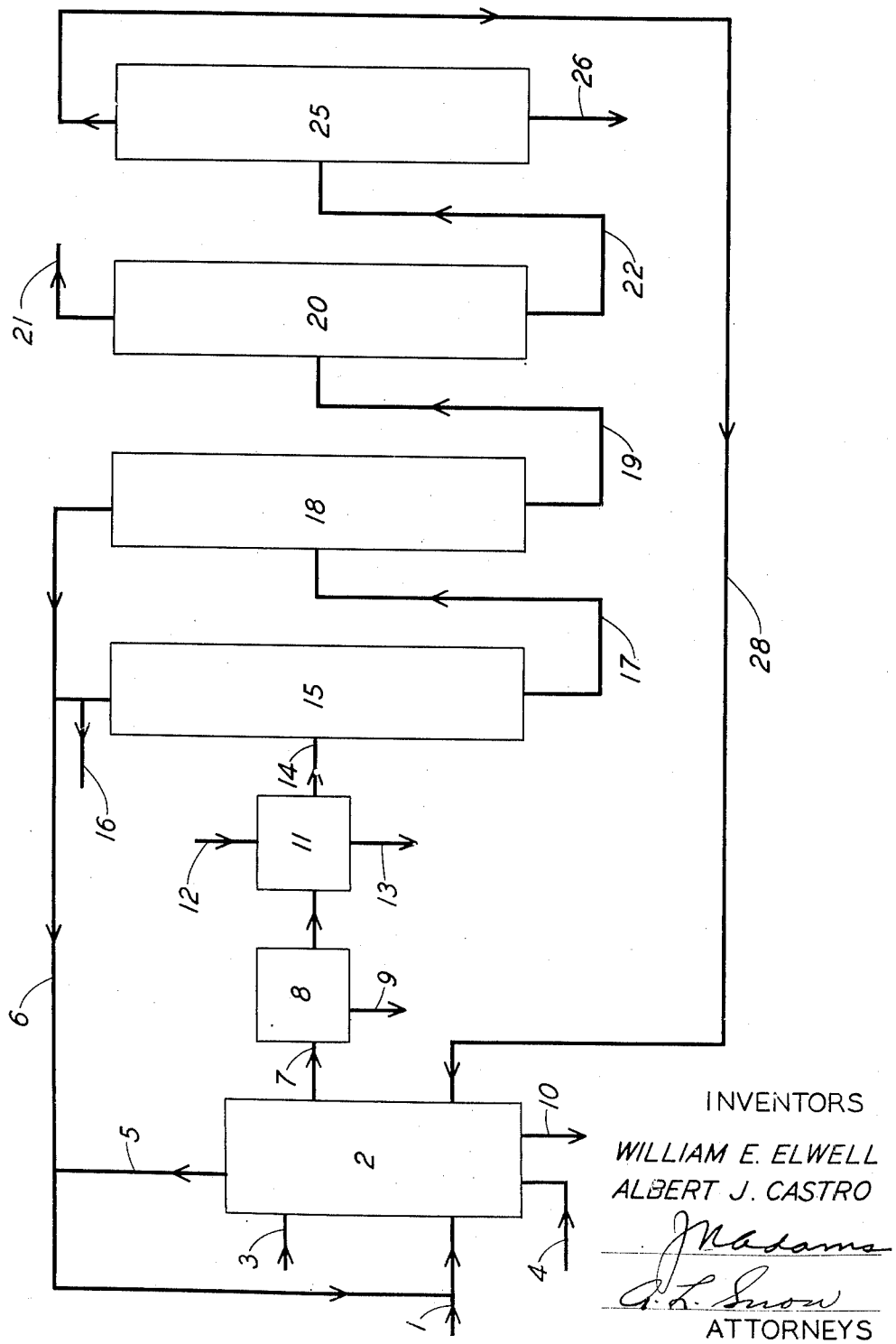
Aug. 14, 1951     W. E. ELWELL ET AL     2,563,826
PROCESS FOR PRODUCING 3,5-DIMETHYL 1-ETHYL BENZENE
Filed Nov. 12, 1947
INVENTORS
WILLIAM E. ELWELL
ALBERT J. CASTRO
ATTORNEYS

PROCESS FOR PRODUCING 3,5-DIMETHYL 1-ETHYL BENZENE

William E. Elwell, Berkeley, Calif., and Albert J. Castro, Tucson, Ariz., assignors to California Research Corporation, San Francisco, Calif., a corporation of Delaware Application November 12, 1947, Serial No. 785,500

2 Claims. (Cl. 260—671)

This invention relates to a process of producing monoethyl xylene or dimethyl ethyl benzenes, and refers particularly to a process of producing 3,5-dimethyl 1-ethyl benzene.

The mono-ethylation of benzene has been well developed by reacting ethylene with benzene in liquid phase in the presence of catalysts of the Friedel-Crafts type or in vapor phase in the presence of silica-alumina, so-called "solid" phosphoric acid, and other catalysts. It is sufficient in producing mono-ethyl benzene to introduce ethylene gas into an agitating liquid mixture of benzene and anhydrous aluminum chloride and aluminum chloride sludge under essentially uncontrolled temperatures and conditions approaching equilibrium. Only a single monoethyl benzene is produced by the reaction accompanied by varying amounts of various di- or poly-ethyl benzenes, and the product of the reaction is readily separated by simple fractional distillation to recover the mono-ethyl benzene in substantial purity. High yields of the desired product are obtained through recycle of the polyethylated products to the reaction zone through disproportionation reactions.

In contrast with this relative simplicity, the mono-ethylation of m-xylene results in the simultaneous production of at least three mono-ethylated xylenes, i. e., the 3,5-dimethyl 1-ethyl benzene, the 2,4-dimethyl 1-ethyl benzene, and the 2,6-dimethyl 1-ethyl benzene. In order to economically produce only the single mono-ethyl xylene, i. e., 3,5-dimethyl 1-ethyl benzene as a product from such process, it is not only necessary to separate this specific mono-ethylated xylene from the other mono-ethylated xylenes produced which have closely similar boiling points, but it is also necessary that these other mono-ethyl xylenes be converted to the desired 3,5-dimethyl 1-ethyl benzene product. It is also desirable that the poly-ethyl xylenes be converted to the desired 3,5-dimethyl 1-ethyl benzene product. Moreover, by virtue of the existence of the two methyl groups on the benzene nucleus to which the ethyl group is thought to be attached, the mono-ethylene alkylation of xylenes is extremely difficult and complicated, particularly with the catalyst of the Friedel-Crafts type. Upon alkylation, particularly with catalyst of the Friedel-Crafts type, xylenes and their products may undergo various isomerizing and disproportionating reactions with the resulting production of a reaction mixture containing a very large number of compounds which are virtually impossible to separate by such means as fractional distillation. Thus, for example, when attempts are made to alkylate m-xylene with ethylene, by isomerization and disproportionating reactions, there may be produced o-xylene, p-xylene, and their reaction products with ethylene, such as 2,3-dimethyl 1-ethyl benzene, 3,4-dimethyl 1-ethyl benzene and 2,5-dimethyl 1-ethyl benzene. There also may be produced a number of diethyl and polyethyl xylenes, and by disproportionation reactions of these with other components of the reaction mixture, there may be produced trimethyl benzenes, diethyl benzenes, toluenes and other products.

The present invention embodies the discovery that a process of producing 3,5-dimethyl 1-ethyl benzene from the alkylation of m-xylene can be carried out without substantial production of undesired isomers or undesired products of isomerization and disproportionation reactions. By the process of the present invention it is found possible to separate the desired 3,5-dimethyl 1-ethyl benzene from the isomers produced in the reaction and by isomerization treatments convert these undesired isomers to the desired product. Moreover, it is possible to establish alkylating conditions under which m-xylene is alkylated which are favorable to the isomerization of ethyl xylenes so that, for example, 2,4-dimethyl 1-ethyl benzene and 2,6-dimethyl 1-ethyl benzene may be isomerized to the 3,5-dimethyl 1-ethyl benzene in the alkylation zone without undue isomerization of the m-xylene or certain undesirable disproportionation reactions which result in the production of undesirable products such as diethyl benzenes. Thus, in accordance with the present invention, undesired ethyl xylenes such as the 2,4-dimethyl 1-ethyl benzene and the 2,6-dimethyl 1-ethyl benzene may after separation from the desired product be recycled to the reaction zone so that a high conversion of the m-xylene to the desired single ethyl xylene or 3,5-dimethyl 1-ethyl benzene may be effected.

It has also been found possible to establish alkylating conditions for alkylating m-xylene with ethylene under which disproportionation reactions may be caused to occur between polyethyl xylenes with the feed resulting in the enhancement of the yield of the desired product 3,5-dimethyl 1-ethyl benzene while at the same time substantially avoiding other undesired disproportionation reactions. Accordingly, in the process of the present invention any diethyl or polyethyl xylenes produced in the reaction zone may be separated from the desired product and recycled to the reaction zone to, by disproportionation reactions, contribute to the production of the desired product.

An object of the present invention is, therefore, to provide a process of producing only 3,5-dimethyl 1-ethyl benzene by the alkylation of m-xylene with ethylene in the presence of Friedel-Crafts type catalyst.

It is a further object of the present invention to provide a method of producing the desired 3,5-dimethyl 1-ethyl benzene in which other ethyl xylenes than the one desired including diethyl and polyethyl xylenes are converted to the desired product by subjecting these undesired products to isomerization and disproportionation reactions preferably carried out in the alkylating zone while at the same time inhibiting isomerization and disproportionation reactions which would result in products such as diethyl benzenes which are substantially impossible to separate therefrom by fractional distillation.

While the ethyl alkylation of benzene is relatively insensitive to the alkylating conditions the alkylation of xylenes using Friedel-Crafts catalyst such as $AlCl_3$ is substantially affected by the alkylating conditions, particularly the time and temperature of treatment. In order to provide a process of alkylating xylenes with ethylene using $AlCl_3$ catalyst in which process the desired isomerization and disproportionation reactions may occur on recycling operations to the exclusion of other undesired isomerization and disproportionation reactions, it is found that the alkylating conditions established should be mild. That is to say, is has been found that while higher temperatures promote alkylation and allow the use of shorter reaction times, the general effect of the increased temperature is to accelerate certain undesired isomerization and disproportionation reactions to a greater extent than high temperature accelerates the desired alkylation reaction. The effect of increased reaction time is likewise to promote alkylation but also may increase to a greater degree certain undesired isomerization and disproportionation reactions. Thus, for example, when meta xylene was alkylated with ethylene, using $AlCl_3$ catalyst and conventional conditions found suitable for alkylating benzene such as a temperature of 95° C. and a reaction time of 18 hours, it was found that considerable isomerization and disproportionation reactions occurred resulting in the production of substantial quantities of toluene, o-xylene and p-xylene, trimethyl benzenes and dimethyl benzenes and high yields of diethyl and polyethyl xylenes. By reducing the temperature of alkylation these undesirable reactions are greatly diminished. There is, however, a lower limit to the temperature at which the reaction may be carried on. At temperatures of about 40° C. and catalyst concentration of about 2 mole % based on xylene, the reaction becomes erratic, that is to say, the ethylene may be absorbed for a short time in the reaction mixture and then at other periods of time pass through the reaction mixture without change. Temperatures of about 45° C.–50° C. appear to be near the lower limit at which alkylation may be maintained. At temperatures of 50° C. using the reaction time of 18 hours and the catalyst concentration mentioned, it is found that alkylation may proceed satisfactorily without the undesired isomerization and disproportionation reactions, particularly if the molar ratio of m-xylene to ethylene introduced in the reaction mixture is maintained substantially over 1. Higher temperatures of alkylation may be used in the process of the present invention in certain cases without too greatly increasing undesired isomerization and disproportionation reactions provided the time of treatment is properly reduced. At a temperature of, for example, 95° C., using a molar ratio of xylene to ethylene of about 2:1, a reaction time of about 0.5 hour, and an $AlCl_3$ concentration of 2 mole % based on xylene, a suitable alkylation treatment may be established. Thus, temperature and time of treatment are in a sense reciprocally acting alkylating conditions, higher temperatures necessitating the use of lower times of reaction and lower temperatures necessitating the use of longer times of reaction if the desired alkylation is to be effected while minimizing the undesired isomerization and disproportionation reactions. In general, at the temperature and pressure chosen for the reaction it is preferred that the time of treatment should be carefully regulated so as to be comparable to the time required for nearly complete absorption of the ethylene and an excess of xylene over ethylene should be maintained.

The process of the present invention will be fully understood from the following description of the preferred example of the invention as given in connection with the accompanying drawings.

In the drawing, the figure represents a diagrammatic view of a suitable apparatus in which the process of the present invention may be conducted, in which drawing, however, for the sake of clarity and simplicity, there have been omitted certain details, such as pumps, valves, measuring means, heat exchangers, coolers, refluxing apparatus, flow meters and like appurtenances as will be readily supplied by one skilled in the art. Likewise, for a low corrosion loss of lines, vessels and columns special materials of construction should be used. These are not referred to since they may be supplied by those skilled in the art without detailed instructions.

In the process as illustrated in the drawings, the m-xylene feed enters the alkylating zone 2 through the line 1. The $AlCl_3$ catalyst in controlled amounts with respect to the total xylene introduced into the alkylation zone, as more particularly described and simplified hereafter, enters the zone 2 by the line 3. Ethylene gas, which may be accompanied by dry HCl is desired, for the purpose of activating the catalyst, is introduced into the alkylating zone 2 through the line 4. The gaseous ethylene is introduced in amounts or proportions controlled with respect to the xylene introduced as hereafter described. In the zone 2, a volume of liquid is maintained of sufficient size relative to the feed rates as to provide the desired reaction time. In zone 2, contact between the catalyst, gas and liquid may be effected without the employment of mechanical devices, although they may be installed and operated as necessary to cause rapid ethylene absorption and reaction. Unreacted ethylene is allowed to leave zone 2 through line 5 and is conveniently reintroduced in the alkylation zone through lines 6 and 1. The principal stream of liquid products of the reaction leaves the zone 2 through line 7 and enters a separator or settler 8 where oil immiscible catalyst collects as a bottom layer and is removed through line 9; to the extent that a spent or partially spent catalyst layer is allowed to collect in the bottom of the zone 2, depending upon the flow rates, turbulence and dimensions of the zone, it may be removed through line 10 continuously or periodically.

It is normally desirable though not necessary to remove the acid reacting components from the liquid reaction product by washing with water or an aqueous alkaline solution, such as diluted sodium hydroxide or carbonate, and for this purpose the reaction products are passed from settler 8 into vessel 11. Water or alkaline water solutions enter vessel 11 through line 12 and may be drawn off through line 13.

Subsequent to washing, the liquid alkylation reaction products enter the fractionating column 15 through line 14. The column 15 operates as a topping still and functions to remove as overhead a stream of constituents of lower boiling points than the boiling points of the xylenes fed to or formed in the alkylation stage of the operation. Such a light overhead stream consists generally of benzene and/or toluene and may be condensed (by means not shown) and returned through line 6 to the alkylation zone if desired. It will usually be found more advantageous to remove this lighter than xylene stream from the column 15 through line 16 without recycling to the alkylation zone. In certain cases the removal of this light stream will be found advisable in order to avoid such alkylation or undesirable disproportionation reactions as might otherwise occur if it was returned to the alkylating zone.

The alkylation products, including unreacted xylenes and xylene isomers, leave the column 15 as liquids through the line 17 and are carried to the fractionating column 18 where a separation is made generally between xylenes and ethyl xylenes. The former, comprising unreacted xylenes and isomers in principal part, leave the column or still 18 through line 6 and are returned after condensation (by means not shown) to the alkylating zone 2 for reaction with ethylene and increasing ethyl xylene production; the latter comprising mono- and polyethyl xylenes, together with certain other products of reaction, such as trimethyl benzene, leave the column 18 as a liquid through line 19 and are carried to column 20.

In column 20 a separation is made between the desired monoethylene xylene or 3,5-dimethyl 1-ethyl benzene as overhead and higher boiling reaction products as a bottom. It is a particular feature of the present invention that the stream leaving column 20 as overhead through line 21 may comprise essentially only the desired 3,5-dimethyl 1-ethyl benzene. The boiling point of the desired 3,5-dimethyl 1-ethyl benzene is 183.75° C., and this product may be separated, although with some difficulty, by ordinary fractional separation means from the other dimethyl ethyl benzenes, i. e., the 1,2,4- and 1,2,6-dimethyl ethyl benzenes formed by alkylation of meta xylene, the boiling points of which are 188.41° C. and 189.75° C., respectively. The separation of these latter products from each other by fractional distillation is virtually impossible, and where the product also includes a close boiling ethyl dimethyl benzene, such as the 1,2,5- having a boiling point of 186.91, the separation from the stream as a pure product of any of the 1,3,5-ethyl dimethyl benzene is virtually impossible. Accordingly, in the process of the present invention, the formation of the 2,5-dimethyl 1-ethyl benzene isomer in the alkylation step is desirably avoided. The other ethyl dimethyl benzenes, aside from the desired product together with diethyl xylenes and other higher boiling products resulting from isomerization and disproportionation reactions, leave the column 20 as a liquid through line 22.

This stream of higher boiling mono-, di- and polyethyl xylenes and other higher boiling point reaction products leaving the column 20 through line 22 may, if desired, be led from the system, but in general, they are passed through line 22 to a column 25 for separation from the top of the column as vapors of the ethyl xylenes, diethyl xylenes and other products boiling within the range of about 187° C. to 250° C., while a liquid product is withdrawn from the column 25 through a line 26. This liquid product or bottoms is ordinarily discarded from the system. The overhead from the column 25, after condensation (by suitable means not shown) may be returned by the line 28 to the reaction zone 2, it being found that to a substantial degree the return of these constituents contribute to the production of the desired 1,3,5 ethyl dimethyl benzene product. While the point of quantity of the desired product 3,5-dimethyl 1-ethyl benzene obtained from the reaction zone may be less than the yield from the reaction zone of isomers such as the 2,4-dimethyl 1-ethyl benzene or the 2,6-dimethyl 1-ethyl benzene, recycling such isomers together with other higher boiling point reaction products produced such as di- and polyethyl xylenes provides a process in which as much as 70%–78% of the m-xylene is converted to the single desired product 3,5-dimethyl 1-ethyl benzene.

The alkylation reaction is generally carried out using a temperature range of about 45°–95° C. and a time of reaction in the alkylating zone of from 0.5–18 hours, the shorter reaction times being applied to the higher temperatures of alkylation and the longer reaction times being applied to the lower alkylating temperatures. The alkylation treatment is ordinarily carried out at atmospheric pressure for economy in operation although pressure may be employed in the alkylating zone to facilitate the reaction. The ratio of $AlCl_3$ catalyst to xylene is not critical to the alkylation process provided sufficient catalyst is utilized to promote the reaction. It has generally been found that about 0.02 mole of anhydrous $AlCl_3$ per mole of xylene feed to the reaction zone is suitable. It is desirable to maintain the $AlCl_3$ concentration as low as possible, consistent with obtaining a satisfactory alkylation rate, in order to minimize isomerization and disproportionation reaction of the undesirable types. The ratio of xylene to ethylene feed to the alkylating zone should ordinarily be above 1 in the neighborhood of 1.5 to 2 as an attempt to achieve complete alkylation of the xylene in one pass through the process will normally lead to an undesirable increase in polyalkylation and certain isomerization and disproportionation reactions.

The following examples of test operations will illustrate the nature of the reactions occurring in the process. In the first example the temperature of alkylation of 50° C. was maintained, a reaction time of 18 hours, a ratio of meta xylene to ethylene of 2.5 was fed to the reaction zone and a molar ratio of $AlCl_3$ to meta xylene of 0.02 fed to the reaction zone. No recycling of separated products was practiced. In a second test operation alkylation was carried out at 95° C., a reaction time of 0.5 hour at atmospheric pressure, and at a molar ratio of meta xylene to ethylene of 2.0 with a molar ratio of $AlCl_3$ catalyst to meta xylene of 0.02. Again there was no recycling to the reaction zone of products of reaction. In the third test operation alkylating conditions were maintained at 95° C., 18 hours of treatment, about 2 moles of meta xylene per mole of ethylene and about 0.02 mole of AlCl₃ catalyst per mole of meta xylene. The product from these alkylating operations possessed the following analyses on a volume per cent basis:

|  | #1 | #2 | #3 |
|---|---|---|---|
| Benzene | 0.0 | 0.0 | 0.0 |
| Toluene | 0.9 | 1.0 | 2.2 |
| Ethyl Benzenes | 0.0 | 0.0 | 0.0 |
| o-xylene | 1.0 | 2.0 | 2.7 |
| m-xylene | 64.0 | 49.6 | 25.0 |
| p-xylene | 1.0 | 3.2 | 6.4 |
| Ethyl Toluene | 0.1 | | |
| Trimethyl Benzene | 0.1 | | |
| 145°–180° C. Fraction | | 4.5 | 17.5 |
| 3,5-dimethyl 1-ethyl benzene | 6.6 | 11.0 | 19.3 |
| 2,4-dimethyl 1-ethyl benzene | 11.0 | 9.1 | 11.7 |
| 2,5-dimethyl 1-ethyl benzene | | 0.6 | 0.5 |
| 2,6-dimethyl 1-ethyl benzene | 3.0 | 2.5 | 2.2 |
| Bottoms | 12.6 | 16.4 | 12.6 |

In the above tabulation the item marked 145°–180° C. fraction represents products of isomerization and disproportionation reactions such as trimethyl benzenes, ethyl toluenes, etc. The item marked "Bottoms" is material boiling higher than the monoethyl xylenes and includes diethyl and polyethyl xylenes.

As can be seen from the foregoing tabulation, while the milder alkylating conditions employed in Example No. 1 resulted in a less complete conversion of m-xylene than in other examples illustrated, the low volume per cents present of toluene, o-xylene, p-xylene, fractions boiling between 145°–180° C. and the absence of any 2,5-dimethyl 1-ethyl benzene indicates desirable conditions for avoiding undesired isomerization and disproportionation reactions. In the second example the more complete conversion of m-xylene is indicated but at the expense of a somewhat higher production of undesirable materials. In Example No. 3 the most complete conversion of m-xylene is experienced but in this example showed larger conversions to the undesirable products. It is to be noted that in each of the examples indicated the volume of the desired product 3,5-dimethyl 1-ethyl benzene relative to the total ethyl xylenes produced and the m-xylene consumed is low showing the necessity in the production of an economic process for a conversion of the undesired products into the desired product.

To illustrate the effect of recycling operations a test operation was carried out in which was fed to the alkylating zone along with the catalyst and m-xylene only the bottoms from Example No. 1 in the ratio of about 8 volumes of xylene to 1 of bottoms. As a result there was produced a product containing 1.5 volumes toluene, 0.2 volume ethyl benzene, 2.0 volumes o-xylene, 71.0 volumes m-xylene, 2.1 volumes p-xylene, 1.1 volumes trimethyl benzene, 15.1 volumes, 3,5-dimethyl 1-ethyl benzene, 3.7 volumes 2,4-dimethyl 1-ethyl benzene, 0.4 volume 2,6-dimethyl 1-ethyl benzene and 2.9 bottoms. Thus, the principal product of the reaction was the desired 3,5-dimethyl 1-ethyl benzene illustrating that the conditions maintained in the alkylating zone were, in fact, effective for converting the bottom material into the desired product. In another test the 2,4-dimethyl 1-ethyl benzene and 2,6-dimethyl 1-ethyl benzene were fed to the alkylating zone along with meta xylene and catalyst but in the absence of any ethylene feed to illustrate the conversion of these ethyl xylenes into the desired product. A ratio of about 6:1 of xylene to ethyl xylenes was employed and a reaction product obtained containing in volume per cent: toluene 1.0; o-xylene 2.4; m-xylene 78.2; p-xylene 2.0; trimethyl benzene 0.9; 3,5-dimethyl 1-ethyl benzene 10.1; 2,4-dimethyl 1-ethyl benzene 4.0; 2,6-dimethyl 1-ethyl benzene 0.7; and bottoms 0.7. Again this test operation illustrated that the feed of these ethyl xylenes to the alkylating zone results in a conversion to the desired product.

By the process of the present invention there is thus provided a process of producing a single ethyl xylene by alkylation of m-xylene with ethylene during which process isomers of the desired product are recycled and converted into the desired product while other products of the alkylation treatment are likewise recycled and converted.

While the specific example of the process hereindescribed is well adapted to carry out the objects of the invention, it will be understood by those skilled in the art that many modifications and variations of the invention as hereinbefore set forth may be made without departing from the spirit and scope thereof, and only such limitations should be imposed as are indicated in the appended claims.

We claim:

1. A process for producing 3,5-dimethyl 1-ethyl benzene containing less than 5% by volume of 2,5-dimethyl 1-ethyl benzene based on the 3,5-dimethyl 1-ethyl benzene which comprises intimately contacting ethylene with a molar excess, based on the ethylene, of essentially pure meta xylene in a reaction zone in the presence of aluminum chloride in amount not exceeding about 2 mol per cent based on the xylene and at a temperature in the range 45° C. to 95° C. for a period in the range 0.5 to 18 hours, the time being of longer duration at lower temperatures and of shorter duration at higher temperatures within said temperature range.

2. A process for producing 3,5-dimethyl 1-ethyl benzene containing less than 5% by volume of 2,5-dimethyl 1-ethyl benzene based on the 3,5-dimethyl 1-ethyl benzene which comprises intimately contacting ethylene with a molar excess, based on the ethylene, of essentially pure meta xylene in a reaction zone in the presence of aluminum chloride in amount not exceeding about 2 mol per cent based on the xylene and at a temperature in the range 45° C. to 95° C. for a period in the range 0.5 to 18 hours, the time being of longer duration at lower temperatures and of shorter duration at higher temperatures within said temperature range, fractionally distilling the reaction product to separate a fraction boiling below 187° C. comprising 3,5-dimethyl 1-ethyl benzene, a fraction boiling in the range 187° C. to about 250° C. comprising diethyl xylenes and a bottom fraction and returning a substantial part of the second mentioned fraction to the reaction zone.

WILLIAM E. ELWELL.
ALBERT J. CASTRO.

(References on following page)

REFERENCES CITED

The following references are of record in the file of this patent:

UNITED STATES PATENTS

| Number | Name | Date |
|---|---|---|
| 2,222,012 | Amos et al. | Nov. 19, 1940 |
| 2,338,711 | d'Ouville et al. | Jan. 11, 1944 |
| 2,388,758 | Mills, Jr. | Nov. 13, 1945 |
| 2,403,785 | Britton et al. | July 9, 1946 |
| 2,416,184 | Lee et al. | Feb. 18, 1947 |
| 2,421,331 | Johnson | May 27, 1947 |
| 2,443,247 | Howell | June 15, 1948 |
| 2,456,672 | Bloch et al. | Dec. 21, 1948 |

OTHER REFERENCES

Norris & Vaala: "The Rearrangement of Xylenes by Aluminum Chloride," Jour. Amer. Chem. Soc., vol. 61, pages 2131-4 (4 pages) (August 1939).

Norris & Ingraham: "Certain Trialkylated Benzenes—Aluminum Bromide," Jour. Amer. Chem. Soc., vol. 62, pages 1298-1301 (4 pages) (May 1940).